US011500888B2

(12) United States Patent
Salvat Lozano et al.

(10) Patent No.: US 11,500,888 B2
(45) Date of Patent: Nov. 15, 2022

(54) METHODS AND SYSTEMS FOR DETECTING ANOMALIES IN CLOUD SERVICES BASED ON MINING TIME-EVOLVING GRAPHS

(71) Applicant: NEC Laboratories Europe GmbH, Heidelberg (DE)

(72) Inventors: Josep Xavier Salvat Lozano, Heidelberg (DE); Andres Garcia-Saavedra, Madrid (ES); Xi Li, Heidelberg (DE); Xavier Costa Perez, Heidelberg (DE)

(73) Assignee: NEC LABORATORIES EUROPE GMBH, Heidelberg (DE)

( * ) Notice: Subject to any disclaimer, the term of this patent is extended or adjusted under 35 U.S.C. 154(b) by 0 days.

(21) Appl. No.: 16/987,442

(22) Filed: Aug. 7, 2020

(65) Prior Publication Data
US 2022/0043811 A1   Feb. 10, 2022

(51) Int. Cl.
*G06F 16/2458* (2019.01)
*G06F 16/28* (2019.01)
(Continued)

(52) U.S. Cl.
CPC ........ *G06F 16/2465* (2019.01); *G06F 16/248* (2019.01); *G06F 16/285* (2019.01); *G06F 16/9024* (2019.01)

(58) Field of Classification Search
None
See application file for complete search history.

(56) References Cited

U.S. PATENT DOCUMENTS

2017/0279668 A1    9/2017  Shevenell et al.
2019/0394101 A1   12/2019  Brown et al.
2021/0133014 A1*   5/2021  Agarwal ............... G06F 11/079

FOREIGN PATENT DOCUMENTS

CN            109213616 A        1/2019

OTHER PUBLICATIONS

Jia, Tong, et al. "An approach for anomaly diagnosis based on hybrid graph model with logs for distributed services." 2017 IEEE International Conference on Web Services (ICWS). IEEE, 2017. pp. 25-32. (Year: 2017).*

(Continued)

*Primary Examiner* — Tony Mahmoudi
*Assistant Examiner* — Umar Mian
(74) *Attorney, Agent, or Firm* — Leydig, Voit & Mayer, Ltd.

(57) ABSTRACT

A method for anomaly detection of cloud services based on mining time-evolving graphs includes steps of receiving tracing data for a plurality of micro-services of the deployed cloud service, wherein the tracing data defines relationships between the plurality of micro-services of the deployed cloud service at a plurality of different time intervals, computing a functional graph based on the tracing data for each of the plurality of different time intervals, wherein nodes of each functional graph include the plurality of micro-services and wherein links between the nodes represent relationships between the plurality of micro-services, comparing the functional graphs for each of the plurality of time intervals to determine an anomaly score for each of the functional graphs, and detecting a presence of one or more anomalies based on the anomaly scores.

14 Claims, 10 Drawing Sheets

(51) Int. Cl.
G06F 16/248 (2019.01)
G06F 16/901 (2019.01)

(56) References Cited

OTHER PUBLICATIONS

Yang, Yu, et al. "Mining density contrast subgraphs." 2018 IEEE 34th International Conference on Data Engineering (ICDE). IEEE, 2018. pp. 221-232. (Year: 2018).*
Qiu, Huida, et al. "Granger causality for time-series anomaly detection." 2012 IEEE 12th international conference on data mining. IEEE, 2012. pp. 1074-1079. (Year: 2012).*
Xie, Kun, et al. "Graph based tensor recovery for accurate internet anomaly detection." IEEE INFOCOM 2018—IEEE Conference on Computer Communications. IEEE, 2018. pp. 1502-1510. (Year: 2018).*
Weng, Jianping, et al. "Root Cause Analysis of Anomalies of Multitier Services in Public Clouds." IEEE/ACM Transactions on Networking 26.4 (2018): 1646-1659. Aug. 2018.
Chen, Haifeng, et al. "Exploiting Local and Global Invariants for the Management of Large Scale Information Systems." 2008 Eighth IEEE International Conference on Data Mining. IEEE, Dec. 2008.
Zhang, Chuxu, et al. "A Deep Neural Network for Unsupervised Anomaly Detection and Diagnosis in Multivariate Time Series Data." Proceedings of the AAAI Conference on Artificial Intelligence. vol. 33. Jan. 27-Feb. 1, 2019.
Yu, Xiao, et al. "Cloudseer: Workflow Monitoring of Cloud Infrastructures via Interleaved Logs." ACM SIGARCH Computer Architecture News 44.2 (2016): 489-502. Apr. 2016.
Du, Min, et al. "Deeplog: Anomaly Detection and Diagnosis from System Logs Through Deep Learning." Proceedings of the 2017 ACM SIGSAC Conference on Computer and Communications Security. Oct. 30-Nov. 3, 2017.
Zhang, Ke, et al. "Automated IT System Failure Prediction: A Deep Learning Approach." 2016 IEEE International Conference on Big Data (Big Data). IEEE, Dec. 2016.
Cheng, Wei, et al. "Ranking Causal Anomalies via Temporal and Dynamical Analysis on Vanishing Correlations." Proceedings of the 22nd ACM SIGKDD International Conference on Knowledge Discovery and Data Mining. Aug. 2016.
Papadimitriou, Panagiotis, et al. "Web Graph Similarity for Anomaly Detection," Mar. 20, 2009.
Ma, Meng, et al. "AutoMAP: Diagnose Your Microservice-based Web Applications Automatically," in Proceedings of WWW '20: The Web Conference 2020, Apr. 20-24, 2020, Taipei, Taiwan. ACM, New York, NY, USA.
Soares, Victor, "Distributed Tracing Anomaly Detection: A Faster, Easier Way to Troubleshoot Microservices Environments," New Relic News and Products, Nov. 27, 2018.
"Microservices," APPDYNAMICS part of Cisco, Jul. 26, 2020.
"Anomaly detection," Dynatrace, Jun. 4, 2019.
Brandon, Alvaro, et al. "Graph-based Root Cause Analysis for Service-Oriented and Microservice Architectures," Oct. 2019.

* cited by examiner

METHODS AND SYSTEMS FOR DETECTING ANOMALIES IN CLOUD SERVICES BASED ON MINING TIME-EVOLVING GRAPHS

GOVERNMENT RIGHTS

The project leading to this application has received funding from the European Union's Horizon 2020 research and innovation programmed under grant agreement No. 856709.

FIELD

Embodiments relate to systems and methods, and in particular methods and systems for anomaly detection of cloud services based on mining time-evolving graphs.

BACKGROUND

One of the main goals of 5G is to open up the infrastructure to vertical sectors (e.g. automotive, health, construction) traditionally alien to the telco industry as a means to enable new services and boost revenue. Verticals (3rd parties deploying applications and services on top of the network) would be able to deploy their services using Orchestration Templates (OTs) that describe the different components that they want to deploy and how they should be interconnected. For example, a 5G core is composed of different services such as a service for user authentication, a service for reading/writing to a database and a service for caching objects of the database, among others. A Cloud Orchestrator (CO) uses these templates to deploy and allocate resources for the services of different verticals. Besides the description of the components, OTs include information on the Service-Level Agreements and/or methods for monitoring resource and service metrics. Depending on the CO used, the format and organization of the templates might differ. For instance, in OpenStack, OTs list the set of virtual machines an application is composed of; while, in Kubernetes, OTs list the containerized services that compose an application. FIG. 1 illustrates an overview of an Orchestration Template, including an example of several services and connections between the services.

In some cases, verticals have changed the architecture of their services or applications moving from a set of Virtual Machines (VMs) using Service Function Chaining (SFC) to micro-services using containers. Micro-services are small independent services loosely coupled and highly maintainable and testable that can enable different capabilities of a service. An application that follows a micro-service architecture may be composed of hundreds or thousands of single-functionality containerized services. For example, a social network would have micro-services for inserting objects to a database, for fast retrieval of cached objects, for user recommendations, etc. A micro-service architecture has many advantages. On the one hand, the whole service is easier to maintain and develop as it is highly modular. Hence, it is easier to enhance or fix problems on specific micro-services and integrate such upgrades or fixes in the whole service architecture. On the other hand, the use of containers packing each micro-service allows for easier deployment, management and control. As each micro-service has a specific functionality, it is easier to control the resources assigned to each of them to provide better resource utilization.

Even though the micro-service architecture has many advantages, it poses some challenges for anomaly detection. An anomaly may include any unexpected behavior (e.g. bugs, poor resource isolation, performance issues, etc.) that could increase, possibly significantly, the response time of a service. First, an increasingly high number of micro-services hinders the ability to detect anomalies because the architecture becomes more complex. Not only could a service be composed of a huge number of micro-services (e.g., from hundreds to thousands) but also it may be difficult to parse and digest all the data and logs of the system. For example, a service composed of a hundred micro-services will need to parse thousands of log lines and metrics. Furthermore, computing the correlation of different metrics between micro-services increases the overall complexity of the detection of anomalies and hinders its scalability. This can be a daunting task, as a great amount of time series from resource to service metrics have to be stored and processed. Second, public/private clouds may accommodate many different tenants so that resource overbooking or poor resource isolation may cause performance interferences.

Accordingly, there is a need for improved methods for detecting anomalies in cloud services or other network environments.

SUMMARY

The present invention provides systems and method for detecting anomalies in cloud services. According to an embodiment, a method for anomaly detection of cloud services based on mining time-evolving graphs includes steps of receiving tracing data for a plurality of micro-services of the deployed cloud service, wherein the tracing data defines relationships between the plurality of micro-services of the deployed cloud service at a plurality of different time intervals, computing a functional graph based on the tracing data for each of the plurality of different time intervals, wherein nodes of each functional graph include the plurality of micro-services and wherein links between the nodes represent relationships between the plurality of micro-services, comparing the functional graphs for each of the plurality of time intervals to determine an anomaly score for each of the functional graphs, and detecting a presence of one or more anomalies based on the anomaly scores.

BRIEF DESCRIPTION OF THE DRAWINGS

Embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments will become apparent by reading the following detailed description with reference to the attached drawings which illustrate the following.

DETAILED DESCRIPTION

Figure 1:
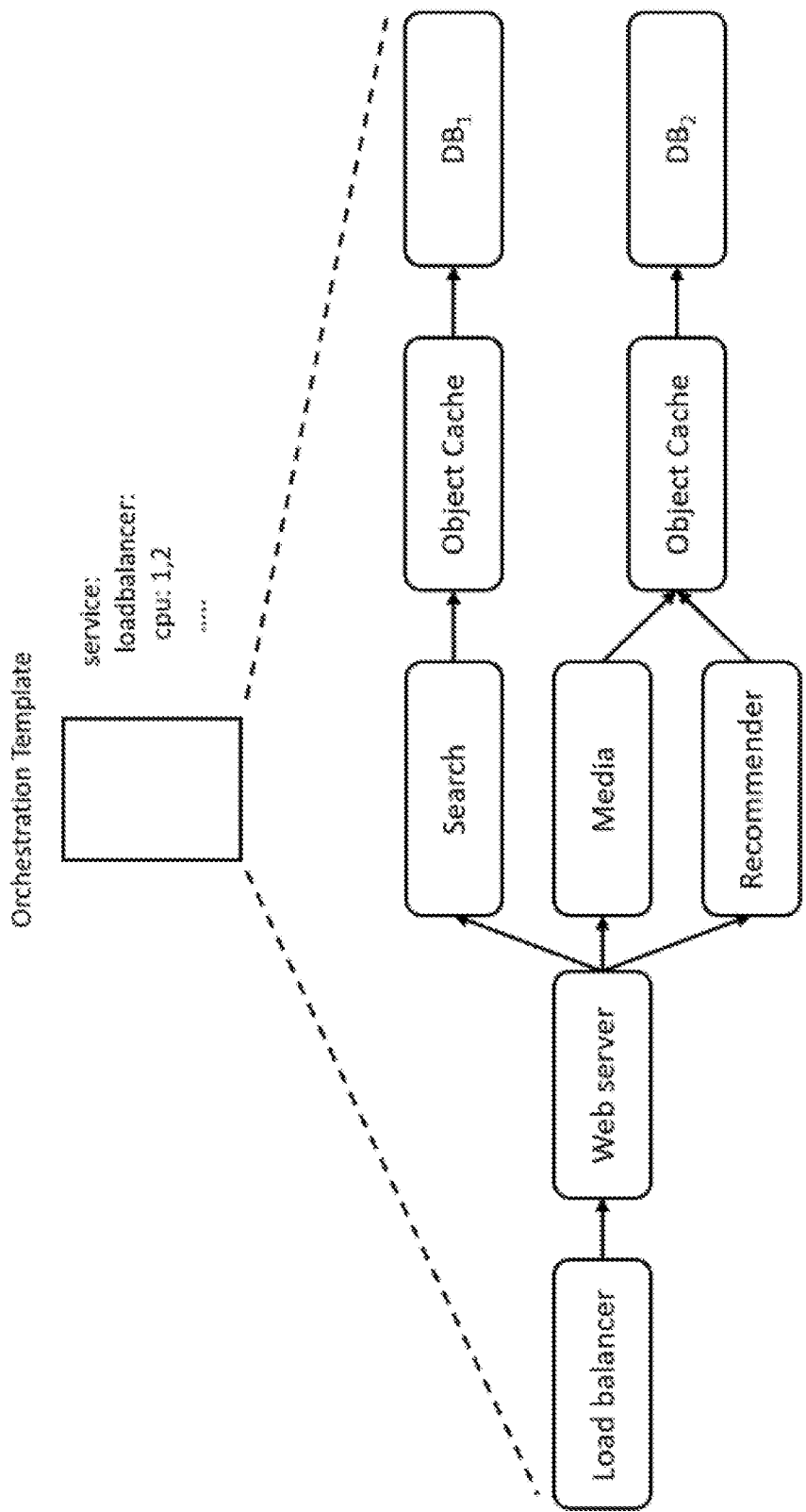
FIG. 1 illustrates an example of an orchestration template (OT)

Accordingly, the present embodiments provide improved systems and methods for anomaly detection, and particularly systems and methods for detecting anomalies in cloud services based on mining time-evolving graphs.

Embodiments of the invention provide systems and methods for detecting anomalies in cloud services that are advantageously reliable, scalable and fast, with no prior knowledge of the service required in contrast with existing solutions.

Embodiments herein advantageously enable novel anomaly detection methods for future network function virtualization (NFV) services, including detection of abnormal changes in the relationship between the micro-services that compose the different call paths of a cloud service.

Embodiments herein also advantageously provide a new anomaly metric: computation of the relations between the micro-services for each of the request types of a cloud service and determining of abnormal changes in their relations considering the time dimension.

Embodiments herein further advantageously enable using tracing data to capture the behavior between the different micro-services that compose the whole service. This is radically different from other methods that compute the relations between services using the correlations between metrics.

According to an embodiment, a method of anomaly detection of cloud services based on mining time-evolving graphs is provided and includes steps, implemented in one or more processors, of receiving tracing data for a plurality of micro-services of the deployed cloud service, wherein the tracing data defines relationships between the plurality of micro-services of the deployed cloud service at a plurality of different time intervals, of computing a functional graph based on the tracing data for each of the plurality of different time intervals, wherein nodes of each functional graph include the plurality of micro-services and wherein links between the nodes represent relationships between the plurality of micro-services, of comparing the functional graphs for each of the plurality of time intervals to determine an anomaly score for each of the functional graphs, and of detecting a presence of one or more anomalies based on the anomaly scores.

According to an embodiment, the relationships defined in the tracing data include a sequence of calls between the plurality of micro-services.

According to an embodiment, the step of computing a functional graph includes computing a weight for each of the links in the functional graph based on the sequence of calls.

According to an embodiment, the step of comparing the functional graphs includes computing a density value for each of the functional graphs and determining an amount of change of the computed density values between the functional graphs.

According to an embodiment, the step of computing a density value includes, for each functional graph, computing one or more subgraphs and for each of the one or more subgraphs computing a density vector based on the average weight of all links in the subgraph, and wherein the step of determining an amount of change of the computed density values between the functional graphs includes comparing the density vectors of different functional graphs.

According to an embodiment, the step of comparing the functional graphs includes comparing functional graphs of consecutive time intervals.

According to an embodiment, the trace data includes only flow-level data.

According to an embodiment, the step of identifying an anomaly includes signaling an anomaly for the processing request and/or outputting a system status classification.

According to an embodiment, the method further includes receiving multiple different processing requests, each of the multiple different processing requests defining a different plurality of micro-services of the deployed cloud service; and for one or more of the multiple different processing requests, performing the steps of receiving tracing data, computing a functional graph, comparing the functional graphs and identifying one or more anomalies.

According to an embodiment, a system is provided that includes one or more processors which, alone or in combination, are configured to provide for execution of a method of detecting anomalies in a deployed cloud service based on mining time-evolving graphs, wherein the method includes receiving tracing data for a plurality of micro-services of the deployed cloud service, wherein the tracing data defines relationships between the plurality of micro-services of the deployed cloud service at a plurality of different time intervals, computing a functional graph based on the tracing data for each of the plurality of different time intervals, wherein nodes of each functional graph include the plurality of micro-services and wherein links between the nodes represent relationships between the plurality of micro-services, comparing the functional graphs for each of the plurality of time intervals to determine an anomaly score for each of the functional graphs, and detecting a presence of one or more anomalies based on the anomaly scores.

According to an embodiment, the relationships defined in the tracing data include a sequence of calls between the plurality of micro-services According to an embodiment, the comparing the functional graphs includes computing a density value for each of the functional graphs and determining an amount of change of the computed density values between the functional graphs.

According to an embodiment, the comparing the functional graphs includes comparing functional graphs of consecutive time intervals.

According to an embodiment, the trace data includes only flow-level data.

According to an embodiment, a method also includes receiving a processing request, the processing request defining the plurality of micro-services of the deployed cloud service.

According to an embodiment, a tangible, non-transitory computer-readable medium is provided that has instructions thereon which, upon being executed by one or more processors, alone or in combination, provide for execution of any of the methods described herein, such as, for example, methods for anomaly detection of cloud services based on mining time-evolving graphs.

The present embodiments provide novel anomaly detection methods that exploit the changes on the relationships across micro-services that compose each of the functional call paths of a vertical service. The embodiments may exploit information on the dynamics of each of the user request types across observations to estimate an outlier score. These changes may be used to signal an anomaly and/or characterize the system state as normal or abnormal. Furthermore, the embodiments advantageously achieve this in a streaming fashion, i.e., comparing the state in one time window with the state of a subsequent (e.g., consecutive or non-consecutive) time window and identifying significant changes between states.

Figure 2:
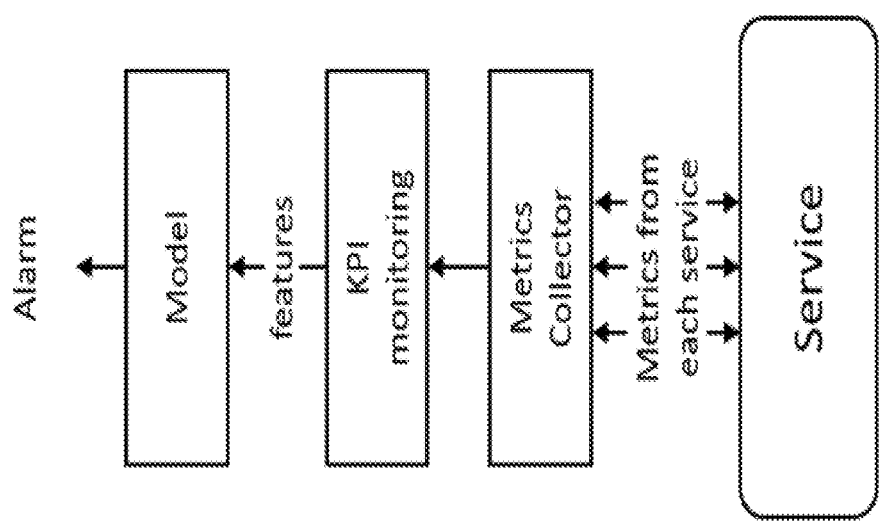
FIG. 2 illustrates a state-of-the-art anomaly detection mechanism.

The fast-growing cloud-based services which may be composed of a great amount of micro-services poses new challenges to anomaly detection. State-of-the-art anomaly detection techniques such as KPI monitoring (e.g. monitoring several service KPIs and triggering an abnormal behavior signal if one of them goes beyond a threshold) are not suited for cloud-services, as micro-service deployments are very complex. FIG. 2 shows an example of the logic of a prior mechanism. In other systems, a model may also be built using machine-learning techniques so it discovers the distribution of the data autonomously and then checks whether the newly input data follows such distribution. However, these methods have several drawbacks. On the one hand, threshold-based models require deep understanding of the system to adjust the optimal values of each threshold. On the other hand, machine-learning models need to be (re-)trained constantly due to changes in the services that could change the distribution of the data they generate. Also, both threshold-based methods and machine-learning method are based on similarity functions that may increase the cost function between non-connected micro-services. Using a graph learning method advantageously enables learning the relation between two micro-services as they are related using a third microservice.

Other solutions may try to exploit the logs of each the components; these logs may contain information on which functions resulted in bad results. However, log-based methods only expose functional anomalies of a component and do not take into account the cascade effect that one anomaly might cause into the whole system as may be done by the present embodiments.

Finally, other methods may exploit certain changes on the invariant relationships (i.e. stable dependencies between certain pairs of system components that are continuously monitored) between components to find anomalies. However, current invariant analysis methods do not take into account either the structure of the call paths (i.e. the sequence micro-services involved in a request) of the different components or the resource allocation across all different tenants of the system as is advantageously done in the present embodiments. Rather, they take a subset of the nodes that compose the network so that they can estimate the relationship between them. Moreover, these methods compute correlations between different metrics from different micro-services and this hinders the scalability of the whole system.

The present embodiments provide numerous advantages over prior systems or anomaly detection mechanisms by providing a real-time anomaly detection system for micro-service based services deployed on a shared cloud environment. The present embodiments advantageously detect abnormal changes in a cloud service that could lead to a potential problem by exploiting information on the dynamics of the relationship between micro-services comprising each functional call path (i.e. the sequence of micro-services involved in a request) of the vertical service in a streaming fashion. In this way, the present embodiments advantageously achieve anomaly detection in a manner that is fast, scalable and without prior knowledge of the service.

Figure 3:
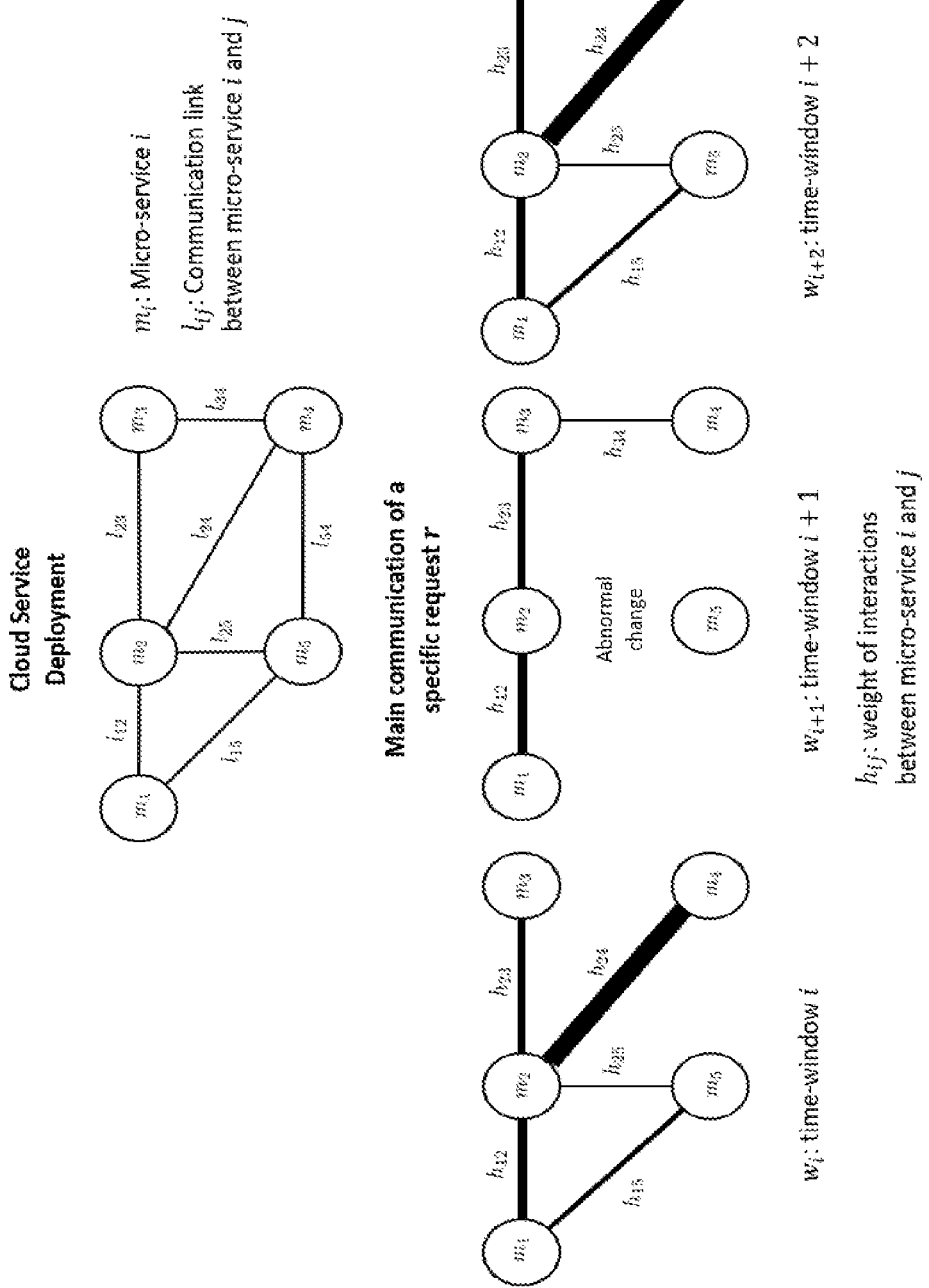
FIG. 3 illustrates an example of a deployment of a service, according to an embodiment.

FIG. 3 shows an example of a deployment of a service that is composed of five micro-services ($m_1$ to $m_5$) connected with different communications links (l) or edges, according to an embodiment. The upper graph shows the Cloud Service deployment. The lower three graphs depict interactions that might occur during different time windows. That is, specific requests are analyzed every time window. The bigger size of the edges of the lower graph indicate that there are more interactions between those two nodes. If the dynamics of a request change significantly as for example in the second time window (middle, lower graph in FIG. 3), an anomaly may be signaled. Accordingly, the various embodiments are advantageously fast, scalable and assume no prior knowledge of the service.

The various embodiments herein advantageously provide the ability to detect abnormal changes in the relationship between the micro-services that compose the different call paths of a cloud service. In contrast to state-of-the-art approaches, the present embodiments need not monitor (aggregated) KPI (features) time series, and address anomalous trends of the feature time series. Rather, certain embodiments compute the relations between the micro-services for each of the user request types of a cloud service and seek abnormal changes between the micro-services.

Figure 4:
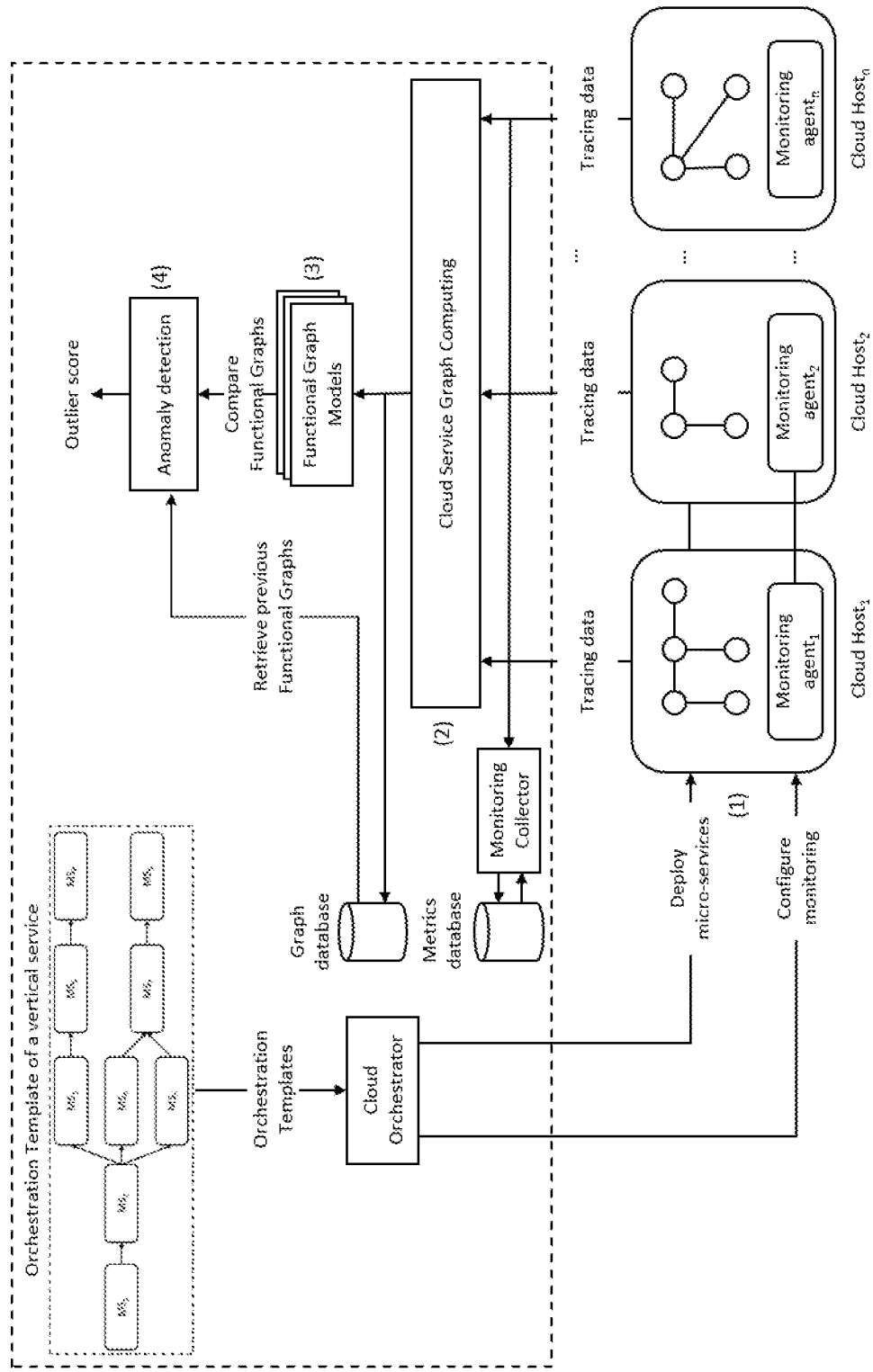
FIG. 4 illustrates a process flow including various functional entities or modules, according to an embodiment.

FIG. 4 illustrates a process flow including various functional entities or modules according to an embodiment. Initially, a Cloud Orchestrator deploys micro-services according to Orchestration template(s) of a vertical service and configures monitoring agents. A functional entity or module, at step 1, receives and parses the orchestration template(s) and collects monitoring samples. At step 2, a graph computing module computes a Cloud Service Graph Set that contains a functional graph for each of the requests types of a cloud service. Each functional graph captures or reflects the relationship between the micro-services involved in each request. The functional graphs may be stored to a graph database. Metrics acquired may also be stored to a metrics database. At step 3, the various functional graphs from different time windows are compared, and an outlier score may be computed for each request type ($o_i$). The outlier score is based in the observation that heavy changes in historically similar graphs should be scored heavily and small changes should be scored lightly. Additional details of all the specific mechanisms described will be detailed below.

1. Parsing Orchestration Templates and Collection of Monitoring Samples (Step 1 in FIG. 4)

In an embodiment, a Cloud Orchestrator (CO) parses Orchestration Templates (OTs), which describe different micro-services a vertical service is composed of, and deploys the micro-services in the underlying infrastructure. The set of cloud hosts that the CO manages may contain other vertical services deployed. However, the scope of the present description is with regard to the detection of anomalies within a vertical service. This could be applied to each of the vertical services deployed. As mentioned herein, OTs outline all micro-services as well as the metrics that are possible to retrieve. Resource usage metrics depend on the type of container that the micro-services use. Other monitoring information such as tracing and service-related metrics may be available if the micro-service supports them. The support (or not) of distributed tracing and service metrics is specified in the OTs. Therefore, once the CO has parsed the OT, a monitoring collector is configured that periodically receives the different types of metrics from the different monitoring agents of the hosts where micro-services are deployed.

Resource usage data may be relatively easier to gather. For instance, some container managers, such as Docker, may support out-of-the-box monitoring of CPU usage, memory usage, disk usage and network resource usage for each container deployed (note that micro-services are usually deployed into containers). Other container managers, such as LXC, also support monitoring. These metrics may be sent together to the monitoring collector so that before storing the values for each time series the messages should be processed. Examples are Telegraf or Logstash. On the other hand, it is also valuable to enhance the resource data with flow metrics data. These metrics can be gathered using, for instance, an sFlow monitoring agent that monitors the current flows between micro-services. Finally, all this data can be stored in a time-series database (e.g., metrics database) using, for instance, Influx or Elasticsearch.

Distributed tracing support depends on the vertical service. Verticals can enable distributed tracing tools with minor modifications to the codebase. For example, tracing metrics allow fined-grained measurements of each of the user requests received. Tracing metrics may include the total time for each request, which micro-services compose the request and the time of operation of each micro-service involved. This practice is becoming increasingly popular as the tools available simplify the support and standardize the APIs for distributed tracing. Distributed tracing has many benefits for debugging API calls. There are many different options to implement distributed tracing. Verticals can use, for instance, OpenTracingAPI or Zipkin to enable distributed tracing of their micro-services. These tools may be directly embedded into the code of each micro-service of a vertical. Whenever a certain function is executed, these agents will send directly time measurements of the micro-service to a collector. Examples include information regarding the functions executed by each micro-service, the start times and end times of the micro-service, the exit code of the function, and which request they belong to. For instance, Zipkin also includes a collector for traces that classifies and displays all the information. Jaeger is another example of a trace collector.

Additionally, service level metrics may include metrics that capture the status of the cloud service, e.g., the number of users connected, the content the users are accessing, etc. These are related to the upper layers of the service rather than the lower layer metrics described before. The vertical may specifies the support for these metrics in the OT.

2. Build Request Graph Model (Step 2 in FIG. 4)

Figure 5:
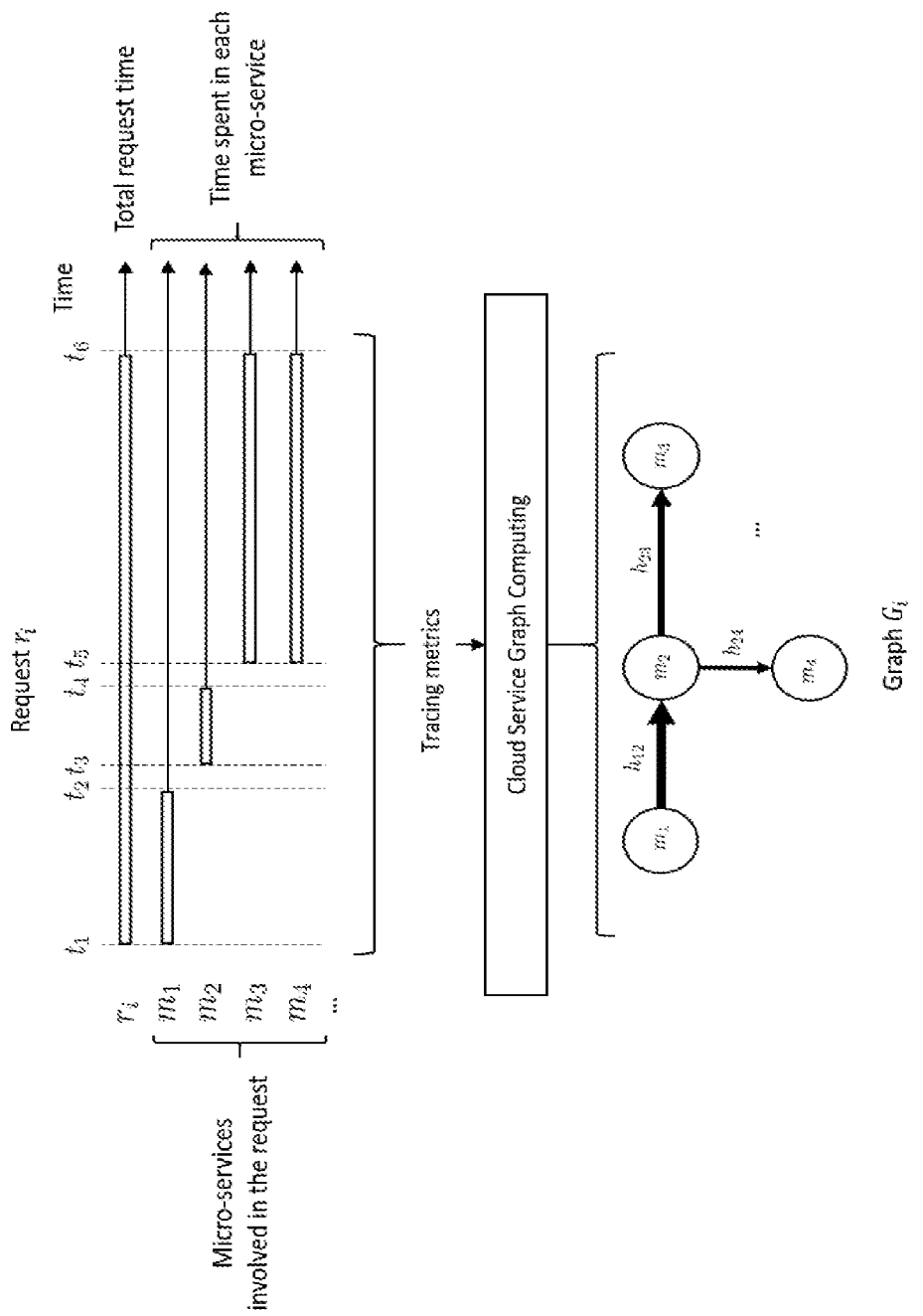
FIG. 5 illustrates a Cloud Service graph computing module, according to an embodiment.

Once the monitor collector receives the different monitoring metrics, the Cloud Service Graph Computing module computes one or multiple graphs to capture user request dynamics for each user. Note that this process will be described assuming that distributed tracing data is available (e.g., using flow-level metrics in an embodiment). In an embodiment, processing proceeds in a slotted fashion, i.e., perfumed continuously every time window w of duration $t_w$. For every time window, w, the Cloud Service Graph Computing module takes as input the tracing metrics and computes a Functional Graph for each request type. FIG. 5 shows the Cloud Service Graph extraction module according to an embodiment. The format of each trace is depicted on the top of the FIG. 5. For example, in an embodiment, each request type $r_i$, is composed of a list of the micro-services involved, the flow of the request, i.e., the order of execution of each micro-service (i.e., the call path) and the start and end execution times of each micro-service. In another embodiment, a list of the functions of each micro-service executed may be included. For each request type, a graph that captures the dynamics of each request is computed. An example of a built graph is shown at the bottom of FIG. 5. In an embodiment, each of the graphs for each request type may be constructed as follows:

In an embodiment, a request may be modelled as, or define, a set of micro-services (or functions, depends on the granularity) called sequentially or in parallel. For example, the tracing data of a specific request could be a sequence of micro-services (or functions) such as $m_1$ call $m_2$ and $m_3$ then $m_2$ calls $m_4$ and $m_4$ calls $m_5$ (i.e. $m_1 \rightarrow m_2$, $m_1 \rightarrow m_3$, $m_2 \rightarrow m_4$, $m_4 \rightarrow m_5$). Therefore, every time a micro-service calls another micro-service, a causal relation exists between them. Thus, each micro-service (of function) calling another function or micro-service may be modeled as two vertexes of a graph related with a directed link. For parallel calls, multiple links are added from source function or micro-service to destination functions or micro-services. For tracing data that provides the functions instead of micro-services the same causal links may be added between functions. For tracing data that only allows micro-service granularity, different links (if possible) may be added for the different requests a micro-service has made to another during a specific request. For tracing data that has an error code for a call between micro-services, no link between the source and destination is added. Next, the weight of each of the causal links between the micro-services of a request type is computed. In an embodiment, the weight function between micro-services (or functions) i and j is a function $h_{ij}$ that depends on various parameters that capture the dynamics of each interaction. This weight can have different forms as long as it captures the dynamics of the service between each source and destination pair. For example, the weight could depend on the number of the total times a micro-service $m_i$ (or a function $f_i$) has been related to another micro-service $m_j$ (or micro-service $m_j$), the number of total calls the source micro-service has made, the number of total calls the destination has received or the time of operation between $m_i$ and $m_j$ among other parameters.

The graphs computed for each of the different request types of the service reflect or capture the dynamics of each of the operations involved on each request in the system. Note that the Functional Graphs may be computed as soon as new data is available; there is no need to wait until the time window finishes to start the computations. In some embodiments, the processing may be constrained to compute the Functional Graphs only for a certain type of request or certain types of requests. Thus, an anomaly may be signaled when there is a problem only on those one or more specific requests. This is a way of giving more importance to certain requests than others. For example, one may be more worried on certain requests that involve higher workloads than the ones that involve lower workloads. Further, in some embodiments, for a time window not all the possible calls that a micro-service can handle may be received. In this situation, according to certain embodiments, two different things may occur: 1) compute the Functional Graphs for the more popular (i.e. received the most) requests types; or 2) compute the Functional Graphs for each request type as soon as a certain number of observations are received.

3.-4. Graph Comparison and anomaly detection (Step 3, 4 in FIG. 4)

Figure 6:
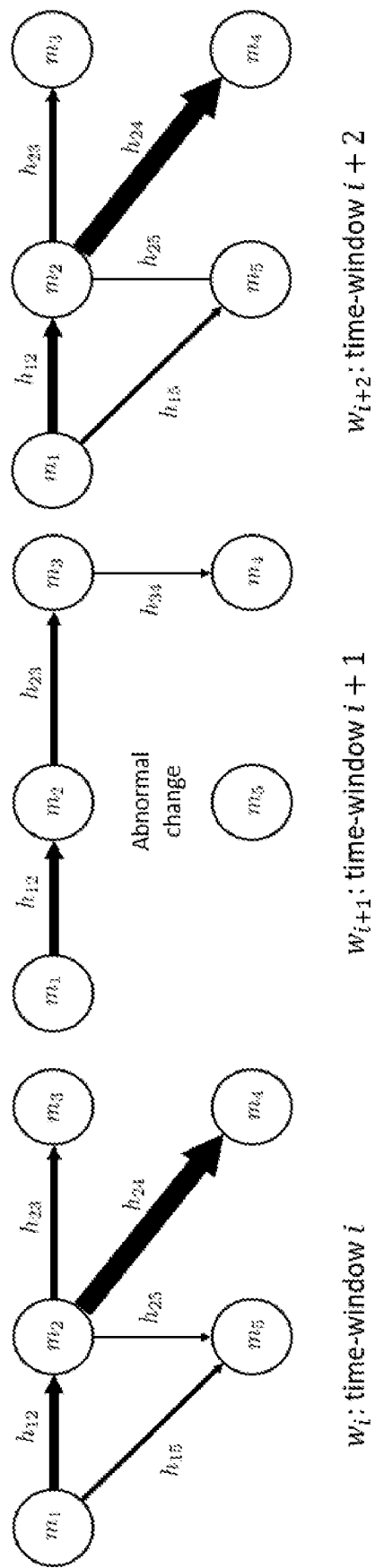
FIG. 6 illustrates graph comparison between time windows, according to an embodiment.

The next step is to compare the different functional graphs from consecutive (or non-consecutive) time windows; the objective is to detect sudden changes in the dynamics of each of the call path graphs so that possible anomalies are discovered. For example, suppose that, for a certain request type during a certain time window, a micro-service $m_i$ (or a function $f_i$) has a causal relation with micro-service $m_j$, $m_k$ and $m_t$ (or functions $f_j$, $f_k$ and $f_t$). If in the next time window, micro-service $m_i$ only makes requests to micro-service $m_j$ for the same request type that could be sign of an anomaly as there has been a change in the dynamics. Similarly, a sudden increase or decrease of the weight of certain links in the call path could also be a signal of an anomaly. FIG. 6 shows a comparison between different time windows.

Figure 7:
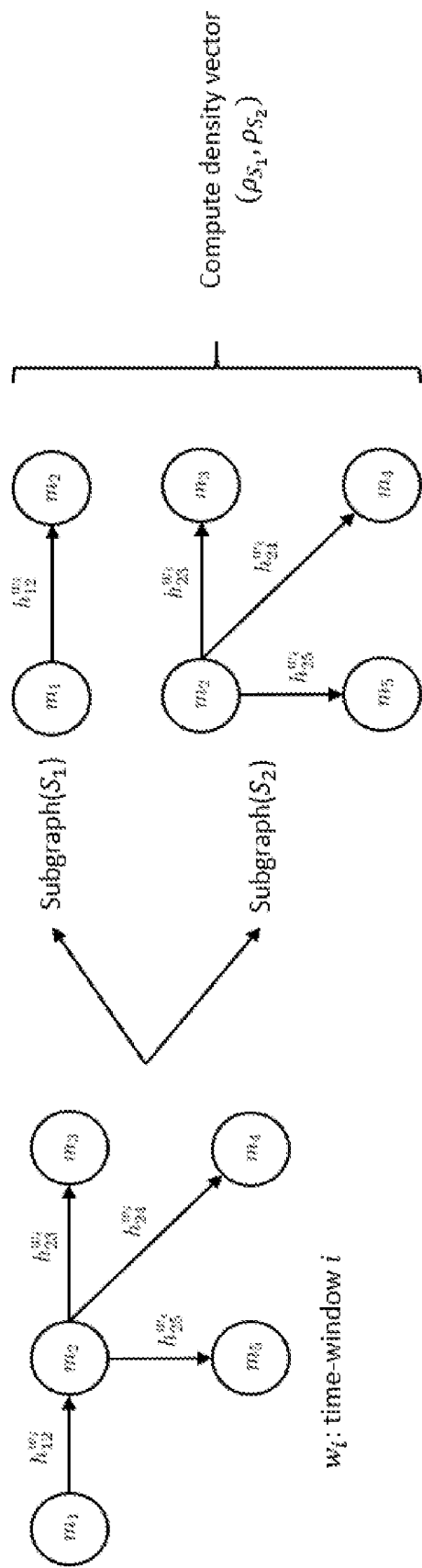
FIG. 7 illustrates an initial anomaly detection step, according to an embodiment.

The anomaly detection module performs two steps, in an embodiment. FIG. 7 illustrates a first step in an anomaly detection process according to an embodiment. In this first step, a density value of the graph of the current time window is computed. In an embodiment, a subset of n subgraphs $S_i$ may be computed for each Functional Graph sampling the source and destination nodes with certain probability. For each of these subgraphs, the density $\rho_{s_i}$ of these subgraphs is computed. This density $\rho_{s_i}$ may be computed as the average weight of all the links in the subgraph. In this way, the density of the relations between the source nodes and the destination nodes is captured for each call path. Intuitively, a less dense graph implies that a lower number of requests have been made. A denser graph could indicate for performance issues as more time has been spent for each call. At the end of this step, outputs may include a density vector, called $\rho_i$, for each of the subgraphs of a certain Functional Graphs and a density vector, called $\rho_i^w$, of the Functional Graph i on time window w.

Figure 8:
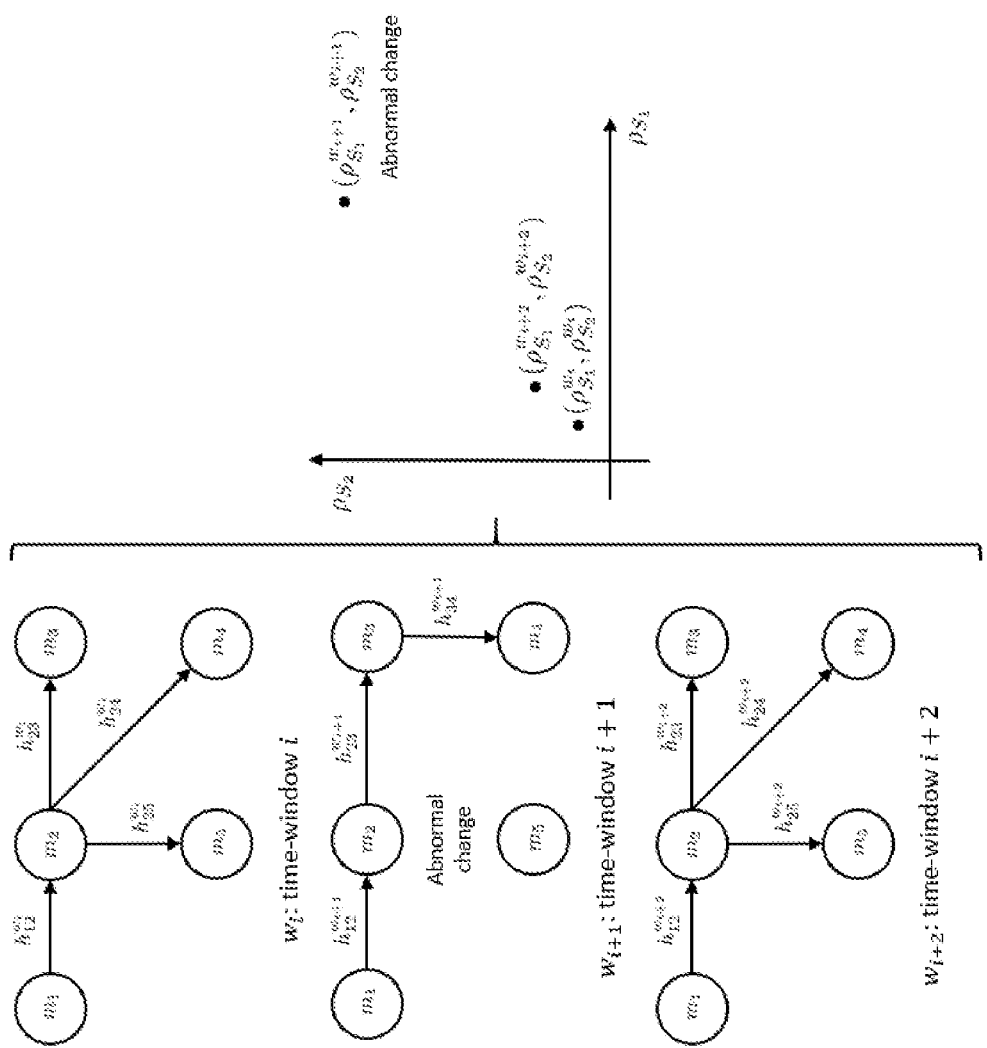
FIG. 8 illustrates a secondary anomaly detection step, according to an embodiment.

FIG. 8 illustrates a second step in an anomaly detection process according to an embodiment. In this second step, the anomaly detection module uses the density vector to compare the Functional graphs across consecutive time windows and compute an anomaly score. In an embodiment, a distance function may be used to evaluate how similar consecutive observations of a request graph may be. The amount of change between densities is a measure of similarity. That is, a distance function may be used to measure similarity so that it is possible to classify consecutive observations as similar or not. Therefore, as an example, if a distance function d applied on the two consecutive call graph densities $d(\rho_i^w, \rho_i^{w+1})$ is less than a certain threshold $\tau$ both graphs are considered similar; otherwise both graphs are considered as dissimilar. An example of a distance function could be using a fractional distance metrics as density vectors could have a high dimensionality.

The instantaneous similarity between functional graphs has been defined. However, certain embodiments capture the similarity attending to historical changes. That is, for every functional graph, the outlier score $o_i^{w+1}$ that captures the dissimilarity of functional graph i in time window w+1 compared to previous graphs may be computed. The rationale is that, for historically similar functional graphs, one would infer small changes in the graph dynamics lightly and bigger changes heavily. The same goes for the opposite: functional graphs that are historically alike infer heavily the similarities and lightly the dissimilarities. In an embodiment, whenever two consecutives graphs are similar, i.e. $d(\rho_i^w, \rho_i^{w+1}) < \tau$, the value of the outlier score will be the value of the previous outlier score plus a reward value that depends on their similarity. Otherwise, if two consecutive graphs are not similar, the outlier score will be the previous outlier score minus a penalty value that depends on the dissimilarity of the two graphs.

In certain embodiments, penalties and rewards may be defined using exponential functions. On the one hand, if two consecutive graphs are similar (i.e. $d(\rho_i^w, \rho_i^{w+1}) < \tau$) then the reward for functional Graph i in the window w+1 is $r_i^{w+1} = \alpha_1^{o_i^w - \alpha_2}$ for $\alpha_1 < 1$ and $a_2 \geq 0$. The outlier score may be computed as $o_i^{w+1} = o_i^w + r_i^{w+1}$. On the other hand, if two consecutive graphs are dissimilar (i.e. $d(\rho_i^w, \rho_i^{w+1}) \geq \tau$) then the penalty is $p_i^{w+1} = \beta^{o_i^w}$ for $\alpha_2 \geq 0$. The outlier score may be computed as $o_i^{w+1} = o_i^w - \rho_i^{w+1}$. Therefore, if two graphs are similar (i.e. their distance is small) the exponential function will likely return a low value. Otherwise, it would return a high value. In this way, the cumulative outlier score may be computed for each of the functional graphs. If we want to find the outlierness value (i.e., a relative outlier value) for a specific time window, it would be the increment between consecutive observations. An anomaly would be high outlierness value that disperses a certain value from the mean of the outlier score.

Figure 9:
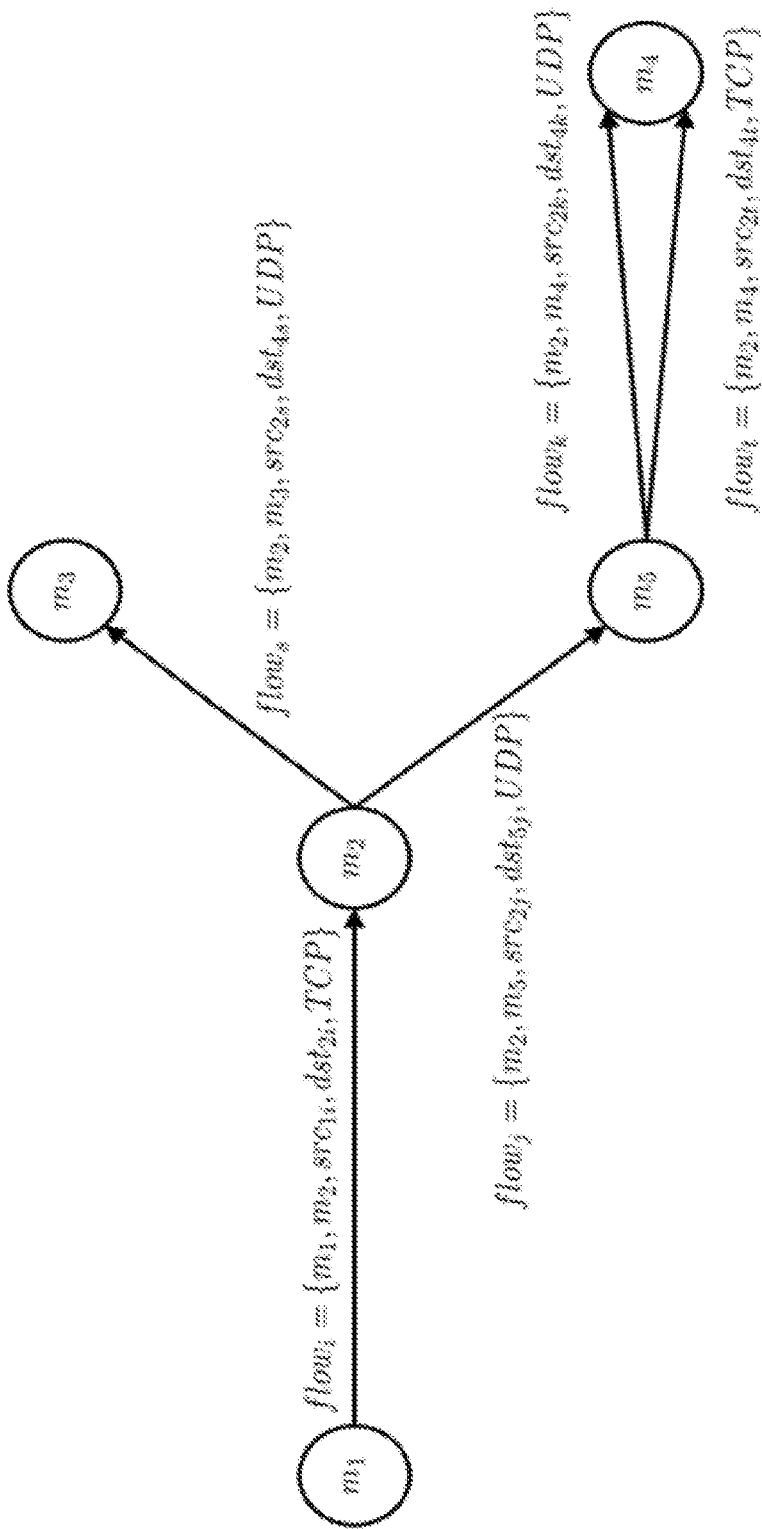
FIG. 9 illustrates a flow-based Cloud Service graph, according to an embodiment.

In another embodiment, only flow-level data may be used to compute a Cloud Service functional graph. In this case, one functional graph may be computed per time window and the previously described logic may be applied to this graph. When it comes to flow-level data, it is assumed that for each window there exists a list of all the flows between micro-services. That is, a list of flows exists, for each of the flows, the ingress micro-service ($m_i$), the egress micro-service ($m_j$), the source (src) and destination (dest) ports of each micro-service, the transport protocol (e.g. TCP, UDP, SCTP etc.) and the number of packets and bytes sent in each direction may be identified. As before, the vertexes of the graph will be the micro-services of the vertical service and a direct link between them models the case where there is a flow between them. Note that there is a link for every different flow between them. That is, for every unique 5-tuple composed of ingress micro-service ($m_i$), egress micro-service ($m_j$), port source (src), port destination (dest) and transport protocol, there is a direct link between two micro-services. The weight of every link may be computed; the weight of every link is a measure of the importance of each link in the whole service. For example, in an embodiment, a weight function may be used that for each link assigns its weight as the total number of bytes sent relative to the total number of bytes the source micro-service has sent during a time window. In this way, the dynamics of the vertical service may be captured. FIG. 9 depicts a process of determining a flow-based Cloud Service graph according to an embodiment. Afterwards, the above processing logic may be applied to such a flow-based Cloud Service graph. For example, the density of successive time graphs and anomaly score(s) may be computed. This can even be coarser, e.g., putting as edges of the graph the virtual links and computing the weights of the links using the bytes and packets sent an receive in each interface. However, the ability to detect anomalies using such approach may be poorer than using the previous graphs constructed using tracing metrics and flow-level metrics as the available information is coarser.

Figure 10:
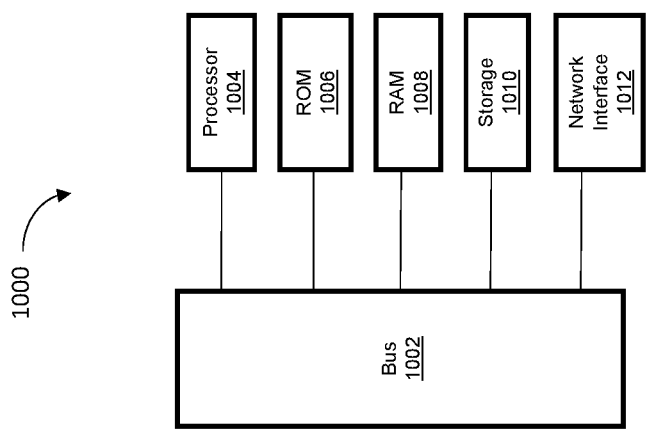
FIG. 10 is a block diagram of a processing system, according to an embodiment.

FIG. 10 is a block diagram of a processing system 1000 according to an embodiment. The processing system 1000 can be used to implement the protocols, devices, mechanisms, systems and methods described above. For example, each functional module may include processing system 1000, or two or multiple modules may be implemented by a processing system 1000. The processing system 1000 includes a processor 1004, such as a central processing unit (CPU) of a computing device or a distributed processor system. The processor 1004 executes processor-executable instructions for performing the functions and methods described above. In embodiments, the processor executable instructions are locally stored or remotely stored and accessed from a non-transitory computer readable medium, such as storage 1010, which may be a hard drive, cloud storage, flash drive, etc. Read Only Memory (ROM) 1006 includes processor-executable instructions for initializing the processor 1004, while the random-access memory (RAM) 1008 is the main memory for loading and processing instructions executed by the processor 1004. The network interface 1012 may connect to a wired network or cellular network and to a local area network or wide area network, such as the Internet, and may be used to receive and/or transmit data, including datasets such as instantiation requests or instructions, analytics task(s), datasets representing requested data or data streams acting as input data or output data, etc. In certain embodiments, multiple processors perform the functions of processor 1004.

In certain embodiments, anomaly detection is done by computing cloud service graphs based on tracing data from each micro-service component, comparing the cloud service graphs between consecutive observations to identify a tendency, e.g., by comparing the density between the graph nodes; calculating an outlier score for each graph based on the historical observations of the tendency, and identifying abnormalities based on the calculated scores.

Certain embodiments provide systems and methods to collect the tracing data of the micro-service, compute a "Cloud Service Graph Set" that contains a Functional Graph for each of the requests types of a cloud service, compare the different graphs from different time windows and compute an outlier score for each request type, and per service classification of behavior as normal or abnormal.

Embodiments herein advantageously provide advanced anomaly detection systems and methods that improve state-of-the-art solutions by considering the time relations of the micro-services composing an NFV service. Fast and scalable solution that does not assume any prior knowledge of the service.

While embodiments have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of detecting anomalies in a deployed cloud service based on mining time-evolving graphs, the method comprising the steps, implemented in one or more processors, of:

receiving multiple processing requests for each of a plurality of different processing request types, each of the plurality of different processing request types corresponding to a different plurality of micro-services of the deployed cloud service; and for each of one or more of the plurality of different processing request types:

receiving tracing data for the corresponding plurality of micro-services of the deployed cloud service, wherein the tracing data defines, for each processing request, relationships between the corresponding plurality of micro-services of the deployed cloud service at a plurality of different time intervals;

computing, for each processing request, a functional graph based on the tracing data for each of the plurality of different time intervals, wherein nodes of each functional graph include the corresponding plurality of micro-services for the processing request and wherein links between the nodes represent relationships between the corresponding plurality of micro-services for the processing request;

for each functional graph: sampling two or more subgraphs, computing a density value for each of the two or more subgraphs, and computing a density vector for the functional graph as the concatenation of the density values of each of the two or more subgraphs based on features of all links in the subgraph, wherein the computing a density vector for the functional graph as the concatenation of the density values of each of the two or more subgraphs based on features of all links in the subgraph includes computing a density vector for the functional graph as the concatenation of the density values of each of the two or more subgraphs based on the average weight of all links in the subgraph;

comparing, for each processing request, the density vector of the functional graphs for the processing request for the plurality of time intervals to determine an anomaly score for the processing request; and detecting, for each processing request, a presence of one or more anomalies based on the anomaly scores.

2. The method of claim 1, wherein the relationships defined in the tracing data include a sequence of calls between the corresponding plurality of micro-services.

3. The method of claim 1, wherein the step of computing a functional graph includes computing a weight for each of the links in the functional graph based on the sequence of calls.

4. The method of claim 1, wherein the step of comparing the functional graphs includes determining an amount of change of the computed density vectors between the functional graphs.

5. The method of claim 1, wherein the trace data includes flow-level data, and wherein the flow level data includes data identifying one or more of a transport protocol, a source port, a destination port, a number of bytes sent and a number of bytes received.

6. The method of claim 1, wherein the step of identifying an anomaly includes signaling an anomaly for the processing request and/or outputting a system status classification.

7. The method of claim 1, further comprising receiving a processing request, the processing request defining the corresponding plurality of micro-services of the deployed cloud service.

8. The method of claim 1, wherein the detecting includes detecting the presence of one or more anomalies using an exponential function over a distance function between density vectors of the functional graphs of successive time windows, wherein smaller changes return a lower value than larger changes.

9. A system comprising one or more processors coupled to a memory storing instructions, which when executed by the one or more processors cause the one or more processors to implement of a method of detecting anomalies in a deployed cloud service based on mining time-evolving graphs, the method comprising:

receiving multiple processing requests for each of a plurality of different processing request types, each of the plurality of different processing request types corresponding to a different plurality of micro-services of the deployed cloud service; and for each of one or more of the plurality of different processing request types:

receiving tracing data for the corresponding plurality of micro-services of the deployed cloud service, wherein the tracing data defines, for each processing request, relationships between the corresponding plurality of micro-services of the deployed cloud service at a plurality of different time intervals;

computing, for each processing request, a functional graph based on the tracing data for each of the plurality of different time intervals, wherein nodes of each functional graph include the corresponding plurality of micro-services for the processing request and wherein links between the nodes represent relationships between the corresponding plurality of micro-services for the processing request;

for each functional graph: sampling two or more subgraphs, computing a density value for each of the two or more subgraphs, and computing a density vector for the functional graph as the concatenation of the density values of each of the two or more subgraphs based on features of all links in the subgraph, wherein the computing a density vector for the functional graph as the concatenation of the density values of each of the two or more subgraphs based on features of all links in the subgraph includes computing a density vector for the functional graph as the concatenation of the density values of each of the two or more subgraphs based on the average weight of all links in the subgraph;

comparing, for each processing request, the density vectors of the functional graphs for the processing request for the plurality of time intervals to determine an anomaly score for the processing request; and detecting, for each processing request, a presence of one or more anomalies based on the anomaly scores.

10. The system of claim 9, wherein the relationships defined in the tracing data include a sequence of calls between the corresponding plurality of micro-services.

11. The system of claim 9, wherein the step of comparing the functional graphs includes determining an amount of change of the computed density vectors between the functional graphs.

12. The system of claim 9, wherein the step of comparing the functional graphs includes comparing functional graphs of consecutive time intervals.

13. The system of claim 9, wherein the trace data includes flow-level data, and wherein the flow level data includes data identifying one or more of a transport protocol, a source port, a destination port, a number of bytes sent and a number of bytes received.

14. A tangible, non-transitory computer-readable medium having instructions thereon which, upon being executed by one or more processors, alone or in combination, provide for execution of a method of detecting anomalies in a deployed cloud service based on mining time-evolving graphs, the method comprising:

receiving multiple processing requests for each of a plurality of different processing request types, each of the plurality of different processing request types corresponding to a different plurality of micro-services of the deployed cloud service; and for each of one or more of the plurality of different processing request types:

receiving tracing data for the corresponding plurality of micro-services of the deployed cloud service, wherein the tracing data defines, for each processing request, relationships between the corresponding plurality of micro-services of the deployed cloud service at a plurality of different time intervals;

computing, for each processing request, a functional graph based on the tracing data for each of the plurality of different time intervals, wherein nodes of each functional graph include the corresponding plurality of micro-services for the processing request and wherein links between the nodes represent relationships between the corresponding plurality of micro-services for the processing request;

for each functional graph: sampling two or more subgraphs, computing a density value for each of the two or more subgraphs, and computing a density vector for the functional graph as the concatenation of the density values of each of the two or more subgraphs based on features of all links in the subgraph, wherein the computing a density vector for the functional graph as the concatenation of the density values of each of the two or more subgraphs based on features of all links in the subgraph includes computing a density vector for the functional graph as the concatenation of the density values of each of the two or more subgraphs based on the average weight of all links in the subgraph;

comparing, for each processing request, the density vectors of the functional graphs for the processing request for the plurality of time intervals to determine an anomaly score for the processing request; and detecting, for each processing request, a presence of one or more anomalies based on the anomaly scores.

* * * * *